United States Patent Office 3,152,054
Patented Oct. 6, 1964

3,152,054
PROCESS FOR TREATMENT OF POLY-
CAPROLACTAM ARTICLES
Eugene Edward Magat and David Tanner, Wilmington,
Del., assignors to E. I. du Pont de Nemours and Company, Wilmington, Del., a corporation of Delaware
No Drawing. Filed July 16, 1962, Ser. No. 210,233
4 Claims. (Cl. 204—154)

This invention is concerned with a process for treatment of polycaprolactam articles to reduce the extractable monomer content thereof. More particularly, this invention is concerned with a process for reducing the extractable monomer content in articles made of polycaprolactam by subjecting such articles to irradiation with high-energy, ionizing radiations.

It is well known in the nylon art that 6-nylon, whether prepared by thermal polymerization of aqueous monomeric ε-caprolactam or by anionic polymerization of anhydrous ε-caprolactam, contains an equilibrium amount of the monomer, of the order of 8–10%, by weight, in the polycaprolactam. This monomer has a softening and plasticizing effect on the 6-nylon and limits its average molecular weight. In the past, it has been known to reduce this monomer content by extraction of the finely-divided polycaprolactam with various solvents for monomer or by heating finely-divided polycaprolactam under a high vacuum. Neither of these methods is suitable for removing ε-caprolactam from shaped articles of 6-nylon, particularly those having relatively gross cross-section such as, for example, as articles cast from anionically-catalyzed ε-caprolactam monomer and polymerized in situ in a mold.

Therefore, it is an object of this invention to provide a process for treatment of shaped articles of polycaprolactam to reduce the monomer content thereof. Other objects and advantages of this invention will appear hereinafter.

In accordance with the object of this invention, it has been discovered that the concentration of ε-caprolactam monomer in polycaprolactam can be significantly reduced by subjecting the polycaprolactam, in the form of a shaped article, to bombardment by high-energy, particle radiation to produce grafting of the residual monomer to the polycaprolactam. By "high-energy particle radiation" is meant an emission of highly-accelerated electrons or nuclear particles such as protons, neutrons, alpha particles, deuterons, beta particles, or the like, so that the said particle impinges upon the polymer bearing the organic compound. The charged particles may be accelerated to high speeds by means of a suitable voltage gradient, using such devices as a resonant cavity accelerator, a Van de Graaff generator, a betatron, a synchrotron, cyclotron, or the like, as is well known to those skilled in the art. Neutron radiation may be produced by bombardment of selected light metal (e.g. beryllium) targets with high energy positive particles. In addition, particle radiation suitable for carrying out the process of the invention may be obtained from an atomic pile, or from radioactive isotopes or from other natural or artificial radioactive materials.

The following examples are cited to illustrate the invention. They are not intended to limit it in any manner. Radiation dosages are given in units of "mrep." (millions of roentgen equivalents physical), a "rep." being the amount of high energy particle radiation which results in an energy absorption of 83.8 ergs per gram of water or equivalent absorbing material. Alternatively and perhaps more accurately, dosages may be indicated in terms of exposure in watt seconds per square centimeter.

*Example I*

By the process of this invention, the equilibrium monomer content which is always present in nylon prepared from caprolactam polymerized at atmospheric pressure, can be attached to the polymer matrix so that the necessity for aqueous or vacuum extraction is eliminated. A sample of drawn polycaproamide yarn of 70 denier and 34 filaments is irradiated with a dosage of 40 mrep. After the irradiation, the yarn is heated to 200° C. in a vacuum of less than 20 mm. for 1 hour. The weight loss (corrected for normal equilibrium moisture content) is 2.1%. When the same treatment, without the irradiation step, is given to a skein of the original yarn, a corrected weight loss of 9.65% is observed. The normal equilibrium monomer content of polycaproamide yarn is about 10%.

*Example II*

A foamed polycaprolactam sheet having a thickness of ½ inch and a density of about 0.45 g./cc., which had been prepared by casting at 150° C. anhydrous ε-caprolactam containing 1% by weight anionic catalyst (reaction product of ε-caprolactam and $NaOCH_3$), about 0.5% of a cocatalyst polymerization promoter (diphenylcarbamyl chloride), 3% surfactant (potassium stearate), and, as blowing agent, 1.5% by weight of a naphtha (B.P. 125–131° C.), was wrapped in a 0.5 mil polyethylene film to reduce contact with air and irradiated by an electron beam from a Van de Graaff electron accelerator, operated at an accelerating voltage of 2 mev. with a tube current of 290 microamperes. The foamed polycaprolactam sheet was passed back and forth under the electron beam on a conveyor at a speed of 40 inches per minute. The radiation dose per pass was 2 mrep. A total of 20 passes was used, thus providing a total dosage of 40 mrep. As compared with an untreated control, the modulus and tensile strength of the irradiated foamed 6-nylon sheet were increased significantly, indicating a corresponding decrease in monomer content since the presence of monomer serves to plasticize the polycaprolactam.

As illustrated in the examples, the shaped 6-nylon article acts as a matrix in which the ε-caprolactam monomer is dissolved and to which it becomes adhered (or grafted) by means of the high energy, ionizing irradiation bombardment. The shaped articles to which the process of this invention is applied may be made by processes known to the prior art such as extrusion, molding, casting, and the like. The shape of the article to which the organic compound is adhered is not critical. Thus, the process of the present invention may be applied to a funicular structure such as a continuous filament, a spun yarn, or the like. It may likewise be applied to a pellicle, a sheet, a molded or cast article such as a gear, a housing, a bowling pin, or a pipe.

It has been observed that irradiation of the shaped polymer matrix in the presence of air or moisture may, in cases, increase the susceptibility of the product to degrade. This can be avoided by employing an atmosphere of inert gas around the article while it is being irradiated. Alternatively, a satisfactory and simpler approach is to wrap the sample in a material which is substantially air and water impervious, thus limiting the quantity of air or moisture contacting the sample. In some of the examples, the samples are wrapped in polyethylene film. The nature of such wrapping material is not critical, provided it is substantially imprevious to air and moisture. Aluminum foil is satisfactory.

It is within the scope of this invention to include in the combination to be irradiated, materials which may have a protective or antioxidant effect in preventing radiation degradation of either monomer or substrate or both. Compounds of this type are cysteine, carbon, and the like. It is also within the scope of this invention to include in the combination to be irradiated materials which absorb radiation and transmit the energy thus absorbed to the monomer or the organic polymeric material or both, whereby adhering is promoted and the efficiency of utilization of the radiation is increased. Compounds with this property are somewhat similar to sensitizers in photography, except that in this case, useful materials absorb high energy radiation and emit the energy in a lower or more usable range. Phosphor screens containing calcium tungstate, zinc sulfide or metallic lead or the like have utility for this purpose. The phosphor materials may be used as plates contacting the article being treated, or may be incorporated in the monomer or even be coated on or dispersed in the polycaprolactam article which it is desired to modify.

The irradiation may be accomplished over a wide range of temperatures. However, a low temperature decreases the tendency towards oxidation. Since the absorption of the radiation frequently causes a temperature increase in the range of about 2° C. for each mrep. absorbed, if high tube current is employed so that absorption is complete within a short time interval, it is usually advisable to provide means to remove the heat generated to avoid injury to the sample. The use of Dry Ice to maintain a low temperature is very satisfactory for this purpose. In general, irradiation at a higher temperature promotes the speed with which bonding occurs, thus promoting a higher throughput of a given piece of equipment at a constant radiation dosage. Temperatures as low as −80° C. and as high as 150° C. may be employed. Maintenance of the sample within the range of from about 0 to about 75° C. is preferred.

In determining the optimum radiation dose for any 6-nylon article, the shape, thickness, and intended use should be considered. Frequently it is desirable to impinge the irradiation on the article from two or more sides alternately in order to achieve uniform treatment of thicker articles. In general, a dose of about 5 mrep. is adequate to initiate bonding between the ε-caprolactam and the polycaprolactam, but it is preferred to use at least a dosage of about 15 mrep., and up to about 60 mrep. may be applied without producing significant degradation of the polymer if sufficient cooling is applied.

The shaped article may contain fillers such as pigments, antioxidants, polymerization catalysts, and the like. After the irradiation, aftertreatment to condition the article to equilibrium moisture, as by immersion in boiling water, may be applied as is known in the nylon art.

To be efficient in the practice of the present invention, it is desirable that the high energy particles have sufficient velocities to permit penetration of the article to a depth of at least half its thickness or to permit penetration of several layers of material, when fabrics or films are being treated. The velocity required will depend on the nature of the particle. An electron particle which is under acceleration by a potential of a million volts (mev.) will effectively penetrate a thickness of solid polycaprolactam of about 0.25 cm., regardless of the form of the shaped article. Acceleration of electrons by 2 mev. will effectively penetrate a solid 6-nylon shaped article having a density of about 1.15 g./cc. to a thickness of ½ cm. Where the 6-nylon is foamed to a lower density, the penetration is correspondingly increased.

In situations where surface effects are paramount, it is not necessary that the shaped article be completely penetrated by the high energy particle, and lower accelerations may be employed. Under these conditions, if the surface effect is to be applied to both sides of the shaped article, it will obviously be necessary to expose each of the surfaces to the particle radiation. This is done by simultaneously bombarding both sides of the shaped article or alternatively by subjecting each side of the single source of irradiation during different runs.

The process of the present invention is useful to affect the softness, resilience, and shrinkage tendency of textiles. It is useful in varying such properties as tensile strength, elongation, modulus, and creep in extruded, molded, or cast articles of polycaprolactam.

This application is a continuation-in-part of copending United States application Serial Number 569,976, filed March 7, 1956, which, in turn, is a continuation-in-part of United States application Serial Number 499,754, filed April 6, 1955, both now abandoned.

We claim:

1. A process for reducing the concentration of monomeric ε-caprolactam in a shaped article of polycaprolactam which comprises subjecting the shaped polycaprolactam article to a dose of from about 5 mrep. to 60 mrep. of high energy, ionzing, particle radiation.

2. A process according to claim 1 in which the shaped article is an extruded polycaprolactam textile fiber.

3. A process according to claim 1 in which the shaped article is a polycaprolactam article cast from anionically-catalyzed monomer.

4. A process according to claim 3 in which the shaped article is a foamed polycaprolactam article.

References Cited in the file of this patent

Majury et al.: Journal Applied Chem., vol. 8 (1958), pages 168–171.